Aug. 23, 1960 O. HOHNECKER 2,950,354

MAGNETIC HEAD SUSPENSION

Filed May 29, 1956 5 Sheets-Sheet 1

INVENTOR.
OTTO HOHNECKER

BY

AGENT

MAGNETIC HEAD SUSPENSION

Filed May 29, 1956 5 Sheets-Sheet 2

INVENTOR.
OTTO HOHNECKER
BY [signature]
AGENT

Aug. 23, 1960 O. HOHNECKER 2,950,354

MAGNETIC HEAD SUSPENSION

Filed May 29, 1956 5 Sheets-Sheet 3

INVENTOR.
OTTO HOHNECKER
BY [signature]
AGENT

INVENTOR.
OTTO HOHNECKER
BY [signature]
AGENT

Aug. 23, 1960 O. HOHNECKER 2,950,354

MAGNETIC HEAD SUSPENSION

Filed May 29, 1956 5 Sheets-Sheet 5

INVENTOR.
OTTO HOHNECKER
BY [signature]
AGENT 2,950,354

MAGNETIC HEAD SUSPENSION

Otto Hohnecker, Morrisville, Pa., assignor to Burroughs Corporation, Detroit, Mich., a corporation of Michigan Filed May 29, 1956, Ser. No. 587,990
7 Claims. (Cl. 179—100.2)

This invention relates to mounting means, but more particularly to improved mounting arrangements for electromagnetic transducers which operate in conjunction with a magnetic storage medium to record and read data in computing and like apparatus.

A conventional type of transducer, or magnetic head, employed in electronic computers to record and read digital data has a magnetic circuit with which one or more windings are linked and which includes a narrow air gap. The head is commonly mounted by stationary means with the gap in close proximity to the storage medium, which may be a thin layer of magnetizable material on the surface of a rotatably mounted disk or drum. In recording, signal excitation of a winding produces an external magnetic field in the vicinity of the gap for magnetization of the storage medium, while in reading, variable flux received from the magnetized medium generates a signal voltage in the same or another winding of the head.

When a disk of appreciable diameter is employed as a support for the magnetizable material, there is a tendency for the disk to warp, causing, during rotation thereof, what is known as "surface runout." With a rigidly mounted head, the variation in head-to-disk spacing due to runout causes irregular changes in the strength of the recorded or of the read signals, as the case may be. Also, with a rigidly mounted head the air gap must be greater than is desirable to clear the "surface runout." This greater air gap results in reduced strength of the recorded or read signals.

Attempts have been made to overcome these and other disadvantages of a rigidly mounted head when operating in conjunction with a disk subject to such runout, but none has met with the degree of success necessary for constant uniform operation. One such attempt comprises the subject matter of a copending application entitled "Mounting for Magnetic Head," Serial No. 519,218, filed June 30, 1955, in the names of Epstein and Stram, and assigned to the assignee of the present invention.

Broadly it is an object of the present invention to provide improved mounting means.

It is also an object of the invention to provide mounting means for a magnetic head assembly wherein the head may be located in close juxtaposed relation to the magnetic memory surface of a rotatable element without undue or detrimental frictional contact therewith.

Another object is to provide such a mounting wherein a substantially constant clearance is maintained between the head and the substantially planar memory surface of a rotatable disk regardless of certain deviations in the contour of the disk surface from a plane.

Still another object is to provide a novel mounting for a magnetic head assembly wherein the assembly is self-adjustable in accordance with certain variations in the surface of a rotatable disk.

A further object is to provide a novel flexible head mounting having a minimum of moving parts, a minimum of friction between moving parts, and a maximum of useful life.

More specifically it is an object to provide mounting means for a magnetic head assembly which is subject to the self-generated pressure of a stream of air passing over the surface of a rotating disk to compensate for variations in surface contour of said disk surface to prevent objectional contact between the assembly and the disk during periods of operation thereof.

A further specific object is to provide a magnetic head suspension which does not require extreme flatness of the disk memory surface for efficient operation thus effecting a reduction in the cost of manufacture of such disks.

Figure 3:
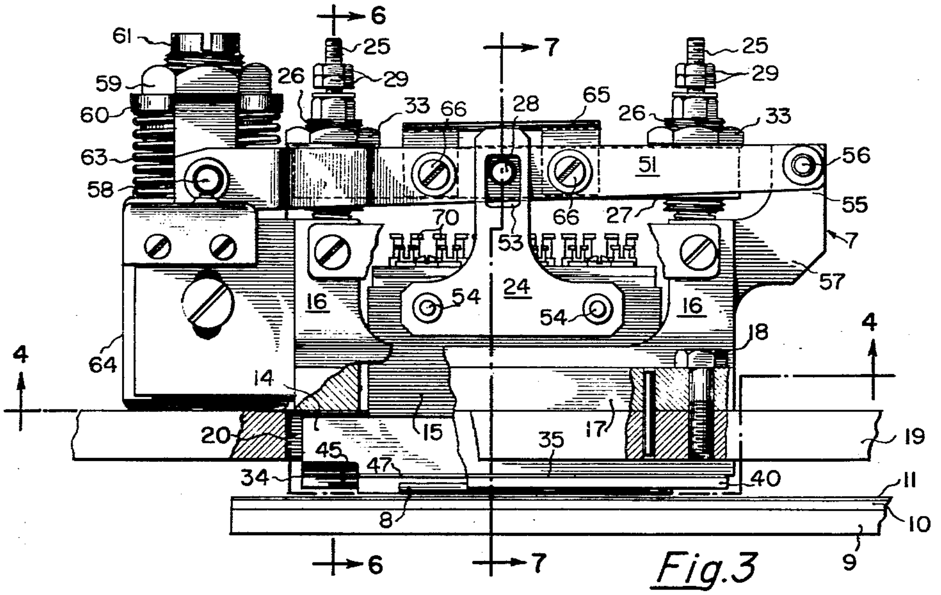
Figure 3 is a side elevation view of the assembly with parts broken away.

Referring to the drawings and particularly to Figure 3 thereof, a structure 7 embodying one form of the present invention is shown associated with a circular disk 10 of non-magnetic material, having on its upper face magnetizable material 11, such as powdered iron oxide dispersed in a solidified resinous vehicle. It should be understood that the material may be a layer across the whole face of the disk or it may be disposed in predetermined patterns. Disk 10 is arranged to be removably attached to the face of a turntable 9. The lower face of turntable 9 may also be covered with a layer of magnetizable material 11 in the same manner as the disk 10. In some instances the upper face of the disk and the lower face of the turntable can be simultaneously used, in which case magnetic heads are positioned both above the disk and below the turntable. Although a plurality of head assemblies may be used for the purpose of the present disclosure, only one such unit will be considered. Turntable 9 is keyed or otherwise secured to a shaft 12 (Figure 7) for rotation in one direction only about its axis, as by a motor 13, and as indicated by the arrow in Figure 12.

Figure 5:
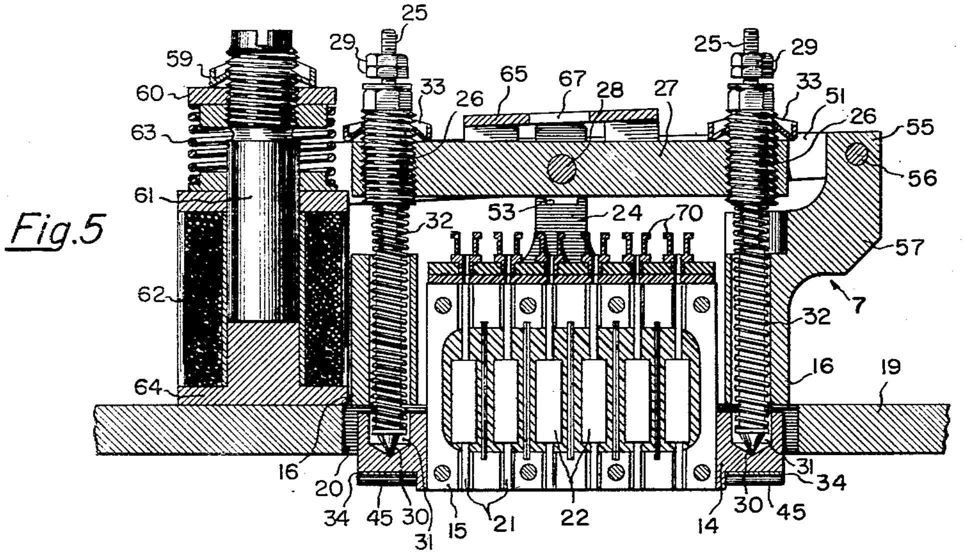
Figure 5 is a sectional view taken on line 5—5 of Figure 2.
Figure 6:
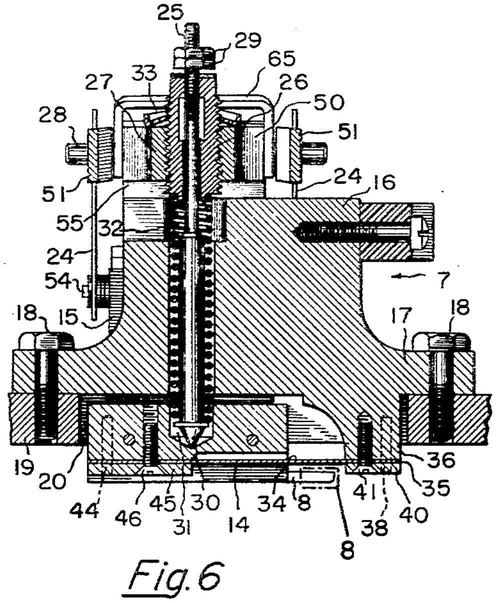
Figure 6 is a sectional view taken on line 6—6 of Figure 3.
Figure 7:
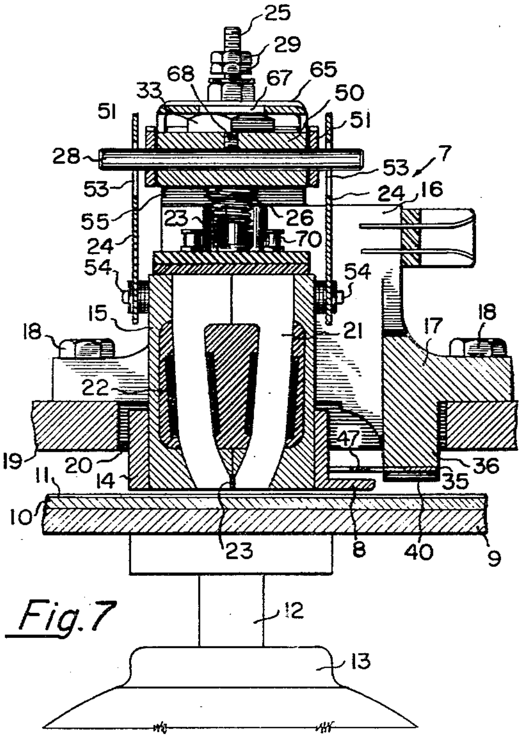
Figure 7 is a sectional view taken on line 7—7 of Figure 3.

For recording and/or reproducing each of such structure 7 includes a head assembly comprising a base 14, see Figures 5 through 7, of non-magnetic material having an upstanding body 15 arranged for movement between standards 16 projecting upwardly from a stationary U-shaped frame 17 attached by screws 18 to a horizontal fixed plate 19. Sufficient clearance is provided between body 15 and standards 16 to permit movement of the head assembly to correct for surface deviations of disk 10, as will be later explained, it being understood, of course, that when reference is made to the surface of disk 10 that the configuration of the magnetic material thereon is included. Plate 19 is formed with an elongated aperture 20 (Figures 2 and 11) radially offset with respect to the axis of the disk and in which portions of the magnetic head assembly are disposed, such aperture preferably being generally complemental to the shape of base 14 and located beneath standards 16. It will be understood, of course, that such an aperture will be provided for each head assembly carried by plate 19.

Figure 4:
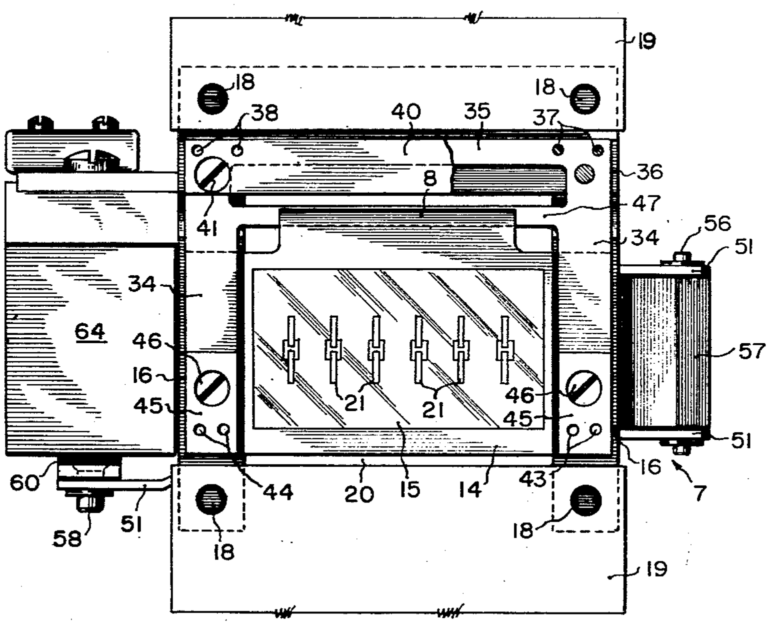
Figure 4 is a sectional view taken on line 4—4 of Figure 3.

As seen in Figure 4, each assembly includes a selected number of aligned magnetic heads 21 embedded in plastic and having their working surfaces flush with the planar bottom face of the body, to line in a row along a radius of disk 10 in a juxtaposed relation to the top surface of disk 10 when mounted for operation. Normally the average spacing or clearance between heads 21 and material 11 is in the order of ½ mil during operation. The heads are each of conventional design, such as shown in Figure 7, having a winding 22 linked with a high permeability magnetic structure including a gap 23 a few thousandths of an inch in width.

Figure 1:
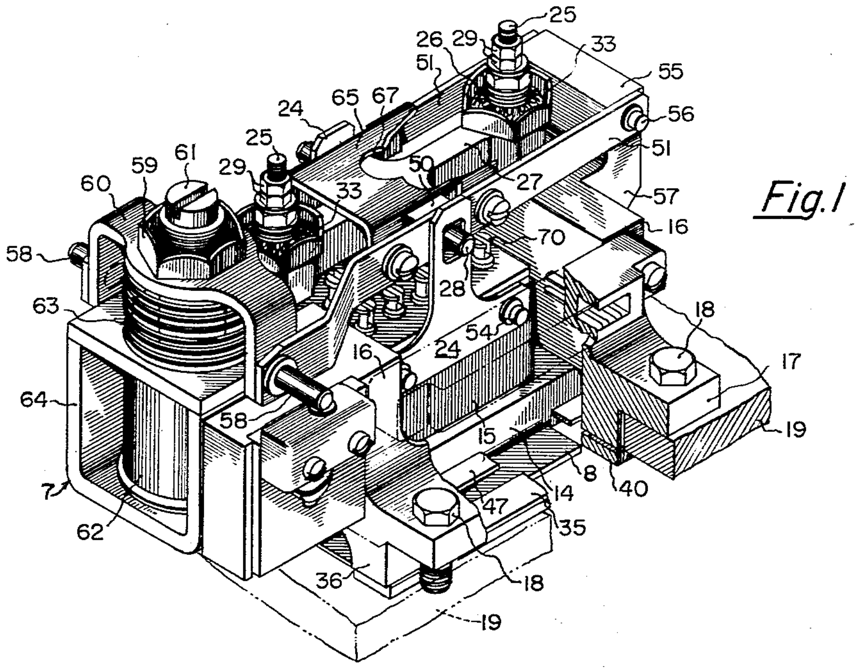
Figure 1 is a perspective view with parts broken away of a magnetic head assembly embodying one form of the present invention.

As a means for supporting the head assembly, see Figures 1 and 3, body 15 is suspended by inverted T-shaped hangers 24 with a lost motion connection operating in conjunction with a flexible or floating control to permit movement of the heads in response to contour deviations of the disk surface as transmitted aerodynamically by an intervening stream of fluid such as air developed by the rotation of disk 10. As shown more clearly in Figures 5 and 6, this flexible control comprises two spindles 25 extending upwardly through standards 16 and through externally threaded hollow bushings 26, which function as adjusting nuts for initial positioning of the parts. These bushing nuts are threaded into the ends of a cross-bar 27 having a medially disposed pivot 28 about which the cross-bar can have a rocking movement. The projecting upper ends of spindles 25 carry supplemental adjusting nuts 29, while the lower end of each terminates in a conical head 30 located in a conical cup 31 in base 14. A compression spring 32 encircles the spindle and seats between the lower end of bushing 26 and head 30. Bushing nuts 26 serve as means for initially adjusting the compression of springs 32 to produce a balance between the spring pressure and a selected pressure of the counter force of the air stream between disk 10 and the head assembly when the latter is in its operative position. After adjustment, bushing nuts 26 are locked by nuts 33.

Figure 8:
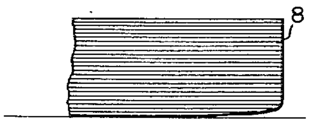
Figure 8 is an enlarged fragmentary side view of a portion of the assembly inclosed in the broken lines indicated by the numeral "8" on Figure 6.

This pre-set adjustment of springs 32 provides means for spacing the heads relative to disk 10, such spacing preferably being in the order of tenths of a thousand of an inch for the passage of the stream of air generated by the rotating disk. This stream of air actually supports the assembly against the pressure of springs 32 which is such as to approximately balance the calculated pressure of the air stream, resulting in a floating or "flying" assembly capable of self-compensation for deviations in the disk surface. The stream of air has a nearly constant thickness at all times regardless of surface deviation, and is responsive to such deviations correspondingly to adjust the head assembly relative to the disk surface. The pressure is developed by the stream of air entering between the head assembly and disk 10, as the latter rotates beneath the head, the speed of rotation being illustratively of the order of 3600 r.p.m. As a related adjunct for effective air response, base 14 may have a shoe 8 attached to or forming a part of its lower face in juxtaposed relation to the surface of disk 10, as more particularly described in the pending application Serial No. 519,218 heretofore mentioned. As seen in Figure 8, shoe 8 has an upwardly inclined and rounded end portion for funnelling the air into the space between base 14 and disk 10.

It should be noted that cross-bar 27 lies in a vertical plane passing through a diameter of disk 10, and therefore the head assembly is free to rock in this plane in response to variation of pressure caused by radial deviations in the disk surface which force the stream of air upwardly against the head assembly and causes it to self-adjust. Should the radial surface deviation be substantially coextensive with the radial dimension of the head then the head will rise bodily against the pressure of springs 32. It is also possible that the deviation in this radial direction will appear at only one end of the radial dimension of the head, in which case the head will rise at that end only, the other end remaining substantially stable. It will also be seen that the head assembly is free to rock about conical heads 30 of spindles 25 in a circumferential direction substantially normal to a diameter of the disk, and in response to circumferential deviaiton in the surface of the disk.

Thus it will be understood that the air stream which has a substantially constant thickness is responsive to surface deviations of the disk automatically to adjust the head to compensate for such deviations and prevent detrimental frictional contact between the head and disk.

With reference to Figure 6 it will be seen that while shoe 8 has a tendency to raise the right hand side of the head in response to the air stream entering the space between it and the surface of the disk, the air stream also generates a turning force in an opposite direction. Normally this turning force would be about the tips of conical heads 30 and sufficient to overcome the opposing force generated beneath shoe 8 and cause the latter to wedge against the disk surface. It will also be noted that because of the freedom of movement provided by the head mounting, the drag of the air stream on the bottom surface of the head assembly exerts a force tending to move the whole head bodily to the left, in the general direction of the disk, as seen in this figure. Such adverse conditions would be detrimental to the accurate positioning of the head relative to the magnetic tracks and pulses on disk 10. To overcome these conditions, a planar U-shaped spring leaf 34, best seen in Figure 4, is positioned in a plane parallel to the direction of the air stream with its bridge piece 35 seated on the bottom of a depending extension 36 of frame 17. Extension 36, preferably has pairs of projecting dowel pins 37 to enter locating holes 38 respectively in the ends of the bridge piece. A clamping strip 40, having matching holes for the dowel pins 37, seats upon the located bridge piece 35 and anchors it to the extension 36 by screws 41. The legs of spring 34 straddle the magnetic head and have end pairs of locating holes 43 respectively to receive dowel pins 44 projecting from head base 14. Strip washers 45 have matching holes for the pins 44 to seat respectively upon the ends of the legs and anchor the leg ends to the base 14 by screws 46. Washers 45 have their inner ends, as seen in Figure 6, terminating in line with a vertical plane through spindles 25. Preferably spring 34 has a supplemental bridge piece 47 spaced from the bridge piece 35 as a reinforcement to resist transverse distortion of the spring in its plane.

As mentioned above, the head rocks in a circumferential direction, that is, in the direction of the air stream and additionally rocks or moves bodily on a radial plane transverse to the path of the air stream. Spring 34 provides flexible means for stabilizing these movements yet without hinderance thereto. In the circumferential rocking movement the two legs of the spring bend forward or backward in unison, while during axial rocking or bodily movement only one leg may move, both may move, or one leg may move upwardly while the other moves downwardly. By combining these motions, base 14 is perfectly self-aligning with contour deviations of the disk surface. At the same time spring 34 holds the head against longitudinal or lateral displacement with respect to the disk.

From the foregoing it will be observed that the head assembly is mounted for self-adjustment with respect to the juxtaposed magnetic layer, and in response to the tendency of the air film to remain of constant thickness with surface contour deviations of the magnetic layer 11, either lengthwise or transverse of the magnetic head.

Since each head assembly unit comprises a number of magnetic heads in alignment along a radius of the disk, when in operative position for a reading process, the rate of change of magnetic flux (and hence the voltage) induced in a head by the passage of a magnetized portion of layer 11, varies from head to head in proportion to the radial position of a head and assuming the magnetized portions of the layer 11 to be of uniform strength at all radii. In addition to compensating for radial variations of the surface contour of the layer, the novel head assembly suspension of the invention also compensates for this effect of radial head position on the strength of the generated signal. This is so because the air film on which the head assembly rides tends to have a thickness proportional to the linear velocity of the portion of the disk at which the film is formed. Since this linear velocity varies directly as the radius, and since the suspension permits of such displacement, the heads at the greater radii will be spaced from layer 11 at greater distances than those at lesser radii. Also since signal strength varies inversely with the spacing, this greater spacing substantially compensates for the otherwise higher signal strength due to the higher linear velocity of the magnetic layer, with the result the heads at the greater radii generate no stronger signals than do those at the lesser radii and hence a substantially uniform strength of signal will be obtained from all heads of a head assembly unit.

Figure 2:
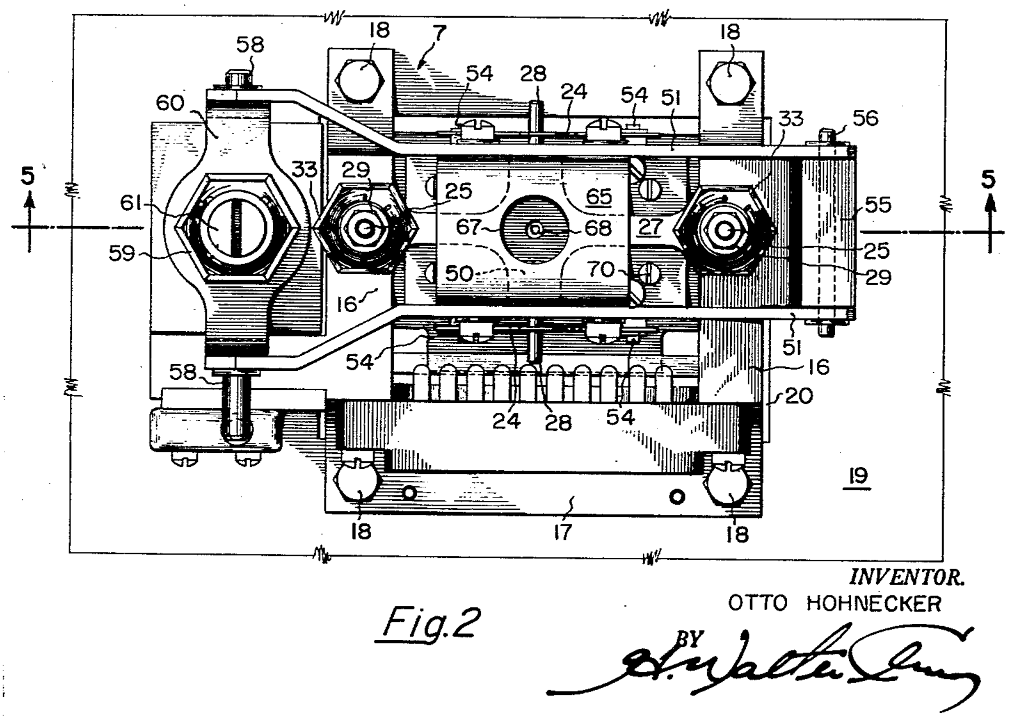
Figure 2 is a plan view of the assembly.
Figure 9:
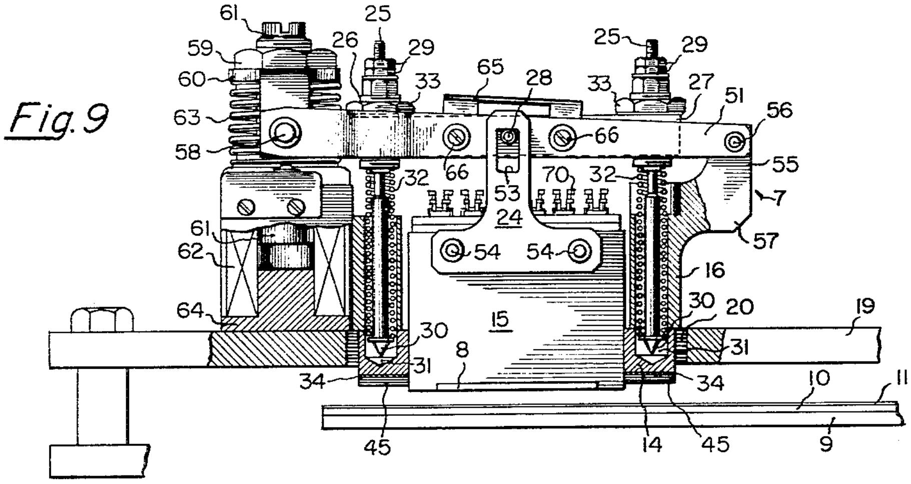
Figure 9 is a side elevation view like Figure 3 but showing the head assembly in its retracted inoperative position.
Figure 10:
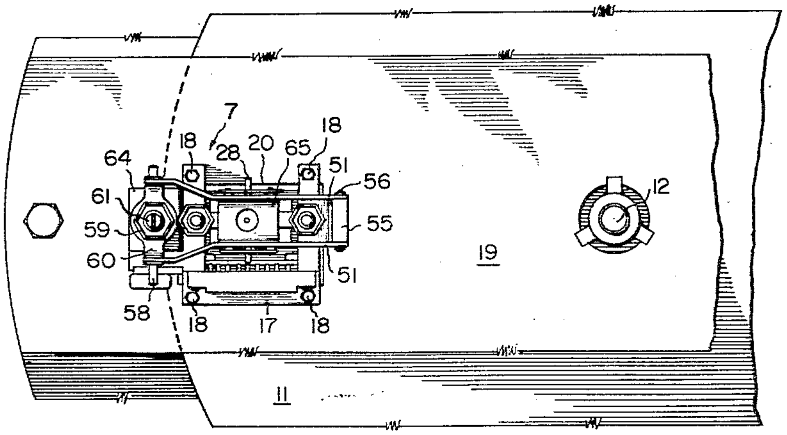
Figure 10 is a fragmentary plan view showing one magnetic head and is relation to a magnetizable disk and associated mounting.

For actuating the cross-bar 27 to permit the head assembly to drop to operative position and also to raise it to inoperate position, as seen in Figures 1 and 2, pivot pin 28 passes through a hub 50 with its ends projecting through two lever arms 51, to provide support means for the two hangers 24. Each hanger is in the shape of an inverted T having its shank provided with a vertically disposed slot 53 to receive an end of pin 28 for lost motion operation, while the T head is fastened by studs 54 to body 15 of the head assembly. The two slots 53, see Figure 9, provide the desired clearance around pivot 28 to permit the head movement described above.

At one end, the two lever arms 51 straddle a bearing 55 of a pivot 56 upon which the arms are mounted for free rocking movement. Bearing 55 is supported by a bracket 57 from frame 17. At their other ends, arms 51 are pivotally connected by studs 58 to the downwardly turned ends of a yoke 60 connected at its center to plunger 61 of a solenoid 62, as shown in Figure 5. Thus when solenoid 62 is energized, with the mounting in the condition diagrammatically illustrated in Figure 13, arms 51 pull cross-bar 27 down to permit the head assembly to drop to its operative position juxtaposed to disk 10, Figure 14. A compression spring 63 (Figure 5) is interposed between a part of plunger 61 and the fixed casing 64 of the solenoid, to provide means for retracting cross-bar 27 when the solenoid is de-energized. The predetermined compression of spring 63 is maintained by adjusting nut 59 on the projecting threaded end of plunger 61. Details of the solenoid 62 and its control circuit may be conventional and therefore need not be shown or described herein. It will be seen that the function of cross-bar 27 is twofold. First, it serves to convert the pivotal motion of lever arms 51 about pivot 56 into an equal and straight line up and down motion of spindles 25 and compression springs 32, and, second, it serves to permit automatic equalization of the pressures between the spaced coil springs 32 when the head assembly shoe 8 is adjusting for higher aerodynamic pressure at the outer periphery of disk 10, or is otherwise compensating for transverse contour deviations.

Preferably arms 51 are laterally braced by a U-shaped bridge piece 65 (Figures 5 and 6) transversely disposed above arms 51 and fixed there at opposite sides respectively by studs 66. Piece 65 has an aperture 67 (Figure 2) in vertical alignment with hub 50 to provide access to a set screw 68 which is threaded through the hub to engage pivot 28 and prevent endwise displacement thereof.

In the present instance the head assembly includes six magnetic heads 21 for selective operation through the medium of electric circuits having terminals 70 mounted upon body 15, with attached circuit wires (not shown) leading respectively to prongs of a multiple connector of conventional type.

In describing the cycle of operation it should be noted that compression springs 32 are initially adjusted with the solenoid plunger 61 in the limit position which it will assume when the solenoid is energized, that is, with base 14 seated upon disk 10, while the latter is idle. With conical heads 30 seated in cups 31, bushing nuts 26 are adjusted to preset springs 32 to balance the force applied by a selected weight which holds the plunger down for this adjusting operation. Nuts 33 lock the adjustment described above. When this adjustment is completed the weight is removed and plunger spring 63 retracts the assembly after which provision is made for sensitive movement of the head, as will be later described. For the purpose of such movement, nuts 29 are adjusted to slightly further increase the compression of spring 32 by withdrawing collared heads 30 from contact with the cups 31 by, for example, one thirty-second of an inch. The initial relation of the parts is adjusted in retracted position of the assembly, as shown in Figures 9 and 13.

Figure 13:
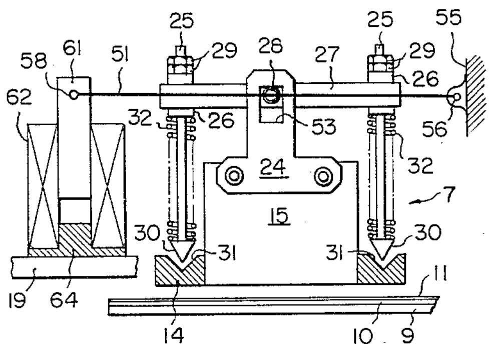
Figures 13, 14, 15, and 16 are diagrammatic views illustrating an operational phase of the head assembly.
Figure 14:
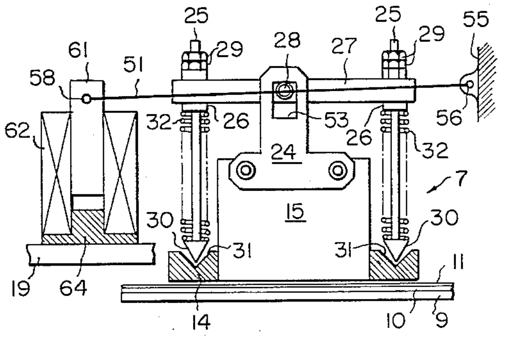

Referring to Figure 13, the start of the cycle shows hangers 24 suspended from pivot 28 to space base 14 from disk 10 due to the retraction of the plunger connected arms 51 through the expansion of the plunger spring 63. Also heads 30 of spindles 25 are out of contact with cups 31, and the assembly is suspended by hangers 24 from pin 28. This condition remains until disk 10 attains the desired rotary speed whereupon solenoid 62 is energized to bring the bottom surface of the assembly including shoe 8 into contact with the stream of air developed at the surface of the disk, see Figure 16.

Figure 12:
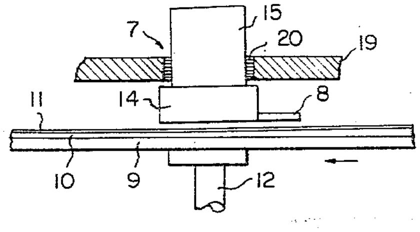
Figure 12 is a diagrammatic view showing the head assembly as it would appear when responding to a disk surface contour deviation in another direction.
Figure 15:
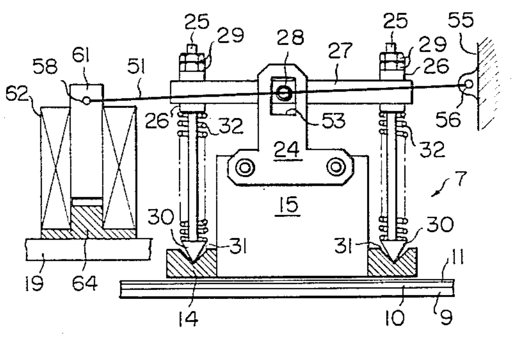
Figure 16:
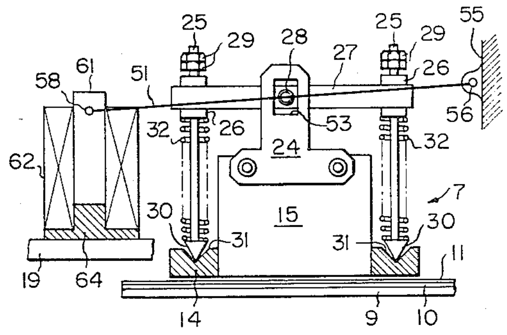

For clarity of description, this energizing movement will be considered in a succession of steps. In the first step, as shown in Figure 13, the head assembly and shoe 8 are relatively widely spaced from the surface of the disk. Hangers 24 are supported from pivot 28 and adjusting nuts 29 are seated on bushing nuts 26 with conical heads 30 out of contact with base cups 31. After disk 10 reaches its desired speed, solenoid 62 is energized to move arms 51 and cross-bar 27 downwardly permitting the head assembly to drop—by gravity—to the air stream, see Figure 14, after which cross-bar 27 presses spindle heads 30 into bearing relation with cups 31, as seen in Figure 15, with pivot 28 now riding relatively free in slots 53, and shoe 8 is in contact with the air film, which is assumed to be now generated. While plunger 61 is completing its final increment of movement to meet the limit stop, arms 51 have lowered cross-bar 27 so that bushing nuts 26 compress springs 32, and nuts 29 are out of contact with the bushings, as shown in Figures 12 and 16. This spacing in the present instance is in the order of one thirty-second of an inch. As a result of this final positioning of the parts, the head assembly is in a comparatively free floating condition—actually in flight—making it self-adjusting automatically in response to surface deviation of the disk.

Figure 11:
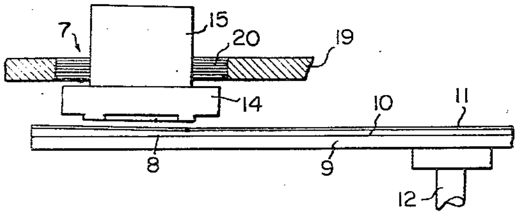
Figure 11 is a diagrammatic view showing the head assembly as it would appear when responding to a disk surface contour deviations in one direction.

In Figures 11 and 12, the reaction of the head assembly to air stream variation is shown somewhat diagrammatically, the former illustrating its relation to the disk surface in response to disk surface contour deviations in one direction and the latter its relation in response to disk surface contour deviations in another direction.

It will now be apparent that a complete unitary magnetic head assembly has been devised automatically compensating for variation of the surface contour of a rotating magnetizable disk to maintain a constant read or write signal without detrimental contact of the heads with the disk.

What is claimed is:

1. A magnetic head assembly including a support, a row of magnetic heads exposed on a substantially planar face thereof, a cross-bar disposed above the head row, hangers attaching said heads to said cross-bar, a lost motion connection between said hangers and said cross-bar, means mounted on said support to move said cross-bar to shift said heads between retracted and extended terminal positions, spring biased means urging said heads toward said extended position for free floating operation in response to fluid pressure against said face and generated by a record member when rotated therebeneath, and flexible means stabilizing said heads during said free floating operation.

2. In a magnetic recording and reproducing apparatus in accordance with claim 1 wherein said flexible means comprises a U-shaped spring leaf having its bottom connected to said support and its two ends connected to said head at opposite ends of said row.

3. A magnetic head structure comprising a support, a head assembly having a substantially planar face movable between retracted and extended positions, a cross-bar pivotally disposed above said assembly, link means connecting said head assembly to said cross-bar, means movable to one position whereby said cross-bar moves said assembly to its retracted position and to a second position to permit movement of said assembly to its extended position, two rods depending respectively from opposite ends of said cross-bar, spring means urging the ends of said rods against said head assembly under compression of said spring when said cross-bar moves to said second position, and means to preset the tension of said springs whereby when said assembly is in extended position the assembly is free floating.

4. Apparatus according to claim 3 wherein said link means includes a lost motion connection permitting said assembly to be released for free floating in its operative position.

5. Apparatus according to claim 3 wherein said assembly includes a row of magnetic heads radially disposed in alignment beneath and parallel to said cross-bar.

6. In a magnetic recording and reproducing apparatus, the combination of, a rotatable member, a magnetizable material on a face of said member, means for rotating said rotatable member, a magnetic head assembly including a support, a row of magnetic heads exposed on a face thereof, a cross-bar disposed above the head row, hangers attaching said heads to said cross-bar, a lost motion connection between said hangers and said cross-bar, means mounted on said support to move said cross-bar to shift said heads between retracted and extended terminal positions, spring biased means urging said heads toward said extended position for free-floating operation in response to fluid pressure against said face when said face is in closely juxtaposed relation to the surface of said rotatable member when the latter is rotating, and flexible means stabilizing said heads during said free floating operation.

7. In a magnetic recording and reproducing apparatus, the combination of, a rotatable member, a magnetizable material on a face of said member, means for rotating said rotatable member, and a magnetic head structure, said head structure comprising a head assembly having a face complementary to the face of said rotatable member and movable between retracted and extended positions, a cross-bar pivotally disposed above said head assembly, link means connecting said head assembly to said cross-bar, means movable to one position whereby said cross-bar moves said assembly to its retracted position and to a second position to permit movement of said assembly to its extended position, two rods disposed respectively from opposite ends of said cross-bar, spring means urging the ends of said rods against said head assembly under compression of said spring when said cross-bar moves to said second position, and means to pre-set the tension of said springs whereby when said assembly is in extended position the assembly is free-floating on a cushion of air generated by the rotatable member when the latter is rotating.

References Cited in the file of this patent

UNITED STATES PATENTS

| | | |
|---|---|---|
| 2,038,216 | Harrison et al. | Apr. 21, 1936 |
| 2,532,803 | Faus | Dec. 5, 1950 |
| 2,537,657 | D'Humy | Jan. 9, 1951 |
| 2,560,569 | Hare | July 17, 1951 |
| 2,612,566 | Anderson | Sept. 30, 1952 |
| 2,772,135 | Hollabaugh et al. | Nov. 27, 1956 |
| 2,802,905 | Taris | Aug. 13, 1957 |
| 2,835,743 | Muffley | May 20, 1958 |

FOREIGN PATENTS

| | | |
|---|---|---|
| 695,150 | Great Britain | Aug. 5, 1953 |
| 763,780 | Great Britain | Dec. 19, 1956 |